United States Patent
Sei et al.

(10) Patent No.: US 7,626,154 B2
(45) Date of Patent: Dec. 1, 2009

(54) IMAGING DEVICE

(75) Inventors: Masafumi Sei, Tokyo (JP); Takashi Masuda, Tokyo (JP)

(73) Assignee: Acutelogic Corporation, Tokyo (JP)

( * ) Notice: Subject to any disclaimer, the term of this patent is extended or adjusted under 35 U.S.C. 154(b) by 615 days.

(21) Appl. No.: 11/560,265

(22) Filed: Nov. 15, 2006

(65) Prior Publication Data

US 2007/0070225 A1  Mar. 29, 2007

Related U.S. Application Data

(63) Continuation of application No. PCT/JP2005/007187, filed on Apr. 7, 2005.

(30) Foreign Application Priority Data

May 26, 2004  (JP)  ............................. 2004-156083

(51) Int. Cl.
*H04N 5/225* (2006.01)
*G02B 5/30* (2006.01)
*H04N 9/07* (2006.01)

(52) U.S. Cl. .................... 250/208.1; 250/226; 348/342; 359/498

(58) Field of Classification Search .............. 250/208.1, 250/226; 348/342; 359/494–498
See application file for complete search history.

(56) References Cited

U.S. PATENT DOCUMENTS

| | | | | |
|---|---|---|---|---|
| 5,739,855 | A * | 4/1998 | Centen et al. ............... | 348/342 |
| 5,834,761 | A * | 11/1998 | Okada et al. .............. | 250/208.1 |
| 6,100,929 | A * | 8/2000 | Ikeda et al. .................. | 348/262 |
| 6,426,493 | B1 * | 7/2002 | Oda ......................... | 250/208.1 |
| 6,549,336 | B2 * | 4/2003 | Tamaru et al. .............. | 359/494 |
| 6,937,283 | B1 * | 8/2005 | Kessler et al. ............... | 348/342 |
| 7,551,221 | B2 * | 6/2009 | Sasaki ......................... | 348/342 |
| 2001/0017741 | A1 * | 8/2001 | Tamaru et al. .............. | 359/885 |
| 2004/0100570 | A1 * | 5/2004 | Shizukuishi ................ | 348/272 |
| 2007/0070225 | A1 * | 3/2007 | Sei et al. ..................... | 348/273 |
| 2007/0268375 | A1 * | 11/2007 | Robinson et al. ......... | 348/222.1 |
| 2008/0170137 | A1 * | 7/2008 | Matsumoto et al. ......... | 348/241 |
| 2008/0192127 | A1 * | 8/2008 | Sakai et al. ............... | 348/222.1 |
| 2008/0218597 | A1 * | 9/2008 | Cho ........................ | 348/222.1 |
| 2009/0169126 | A1 * | 7/2009 | Masuda et al. .............. | 382/255 |

FOREIGN PATENT DOCUMENTS

| | | |
|---|---|---|
| JP | 07-007733 | 1/1995 |
| JP | 2001-292455 | 10/2001 |
| JP | 2004-032350 | 1/2004 |

\* cited by examiner

*Primary Examiner*—John R Lee
(74) *Attorney, Agent, or Firm*—Connolly Bove Lodge & Hutz LLP (57) ABSTRACT

Frequency characteristics of an optical low-pass filter (2) are set in such a way that a first false color passing rate indicative of the rate of frequency components passing through a frequency component region not lower than the Nyquist frequency fa for the lowest sampling frequency fs among the sampling frequencies in the longitudinal, the lateral, and the oblique directions for each color in an image sensor (5), i.e. a frequency component region lower than one half of the Nyquist frequency fs of the sampling frequency fs of the image sensor (5), is not higher than a specified value. An output image signal is created from a pixel signal created by the image sensor (5) so that N pixel signals (N is real number of 2 or above) created by the image sensor (5) correspond to one output image signal.

6 Claims, 11 Drawing Sheets

[THE CASE OF 45° OBLIQUE SQUARED GRID ARRANGEMENT]

(a) SQUARED GRID ARRANGEMENT (b) 45° OBLIQUE SQUARED GRID ARRANGEMENT

(a) SQUARED GRID BAYER ARRANGEMENT

(b) SAMPLING IN LATERAL DIRECTION FOR G (c) SAMPLING IN LATERAL DIRECTION FOR R AND B (d) SAMPLING IN OBLIQUE DIRECTION FOR G (e) SAMPLING IN OBLIQUE DIRECTION FOR R AND B

Fig. 13

(a) 45° OBLIQUE SQUARED GRID BAYER ARRANGEMENT

(b) SAMPLING IN LATERAL DIRECTION FOR G (c) SAMPLING IN LATERAL DIRECTION FOR R AND B (d) SAMPLING IN OBLIQUE DIRECTION FOR G (e) SAMPLING IN OBLIQUE DIRECTION FOR R AND B

IMAGING DEVICE

CROSS-REFERENCE TO RELATED APPLICATION

This application is a continuation under 35 USC 120 of co-pending International application PCT/JP2005/007187 filed on Apr. 7, 2005. International application PCT/JP2005/007187 claims priority to Japanese application 2004-156083 filed on May 26, 2004. The entire contents of each of these applications are incorporated herein by reference.

TECHNICAL FIELD

The present invention relates to an imaging device for apparatus such as digital cameras and digital video cameras, and more particularly to an imaging device that takes an image of an object with a single-chip image sensor.

BACKGROUND ART

Conventionally, when an imaging device for taking color images is configured with a single-chip image sensor, photodiodes (pixels) are arranged like a squared grid or a 45° oblique squared grid, and color filters corresponding to color components such as R (red), G (green), and B (blue) are arranged on the photoreceptive surface of the respective photodiodes in a regular pattern such as "R G G B." For the squared grid arrangement, an output image signal for the amount of one pixel is output from each pixel of the image sensor. For the 45° oblique squared grid arrangement, an output image signal for the amount of two pixels is output from each pixel of the image sensor. Thus, an output image is generated.

In such an imaging device for taking color images, in order to generate an accurate output image, the sampling frequency of the image sensor needs to be equal to or higher than double the spatial frequency of an object to be taken. That is, if the spatial frequency of the object is higher than the Nyquist frequency of the image sensor (half the sampling frequency), false colors (color moires) may occur at locations such as the boundary of a light portion and a dark portion of the object. Therefore, an optical low-pass filter is typically provided in the optical path with its cutoff frequency set to the Nyquist frequency of the image sensor, so that the imaging light directed to the image sensor is filtered.

As a conventional imaging device configured with a single-chip image sensor, an invention described in Japanese Patent Laid-Open No. 6-141330 has been proposed (Patent Document 1). The invention described in this specification mainly includes an image sensor of single- or two-chip type and a low-pass filter circuit having the cutoff frequency not higher than half the sampling frequency and detecting valid R, G, and B components from outputs of a video amplifier circuit.

Patent Document 1: Japanese Patent Laid-Open No. 6-141330

DISCLOSURE OF THE INVENTION

However, with single-chip image sensors proposed so far including the invention described in the Japanese Patent Laid-Open No. 6-141330, an output image is formed so that the pixels of the imaging sensor and the pixels of the output image are in the ratio 1:1 or 1:2. Therefore, each pixel forming the output image only receives an output signal of any one of R, G, and B from the image sensor, and signals of the other two colors are interpolated from other pixels around that pixel, so that it can be said that the output color is estimated. Thus, while a three-chip image sensor never causes false colors because each pixel receives signals of R, G, and B, a single-chip image sensor involves difficulty in reproducing exact colors and tends to cause false colors.

Figure 2:
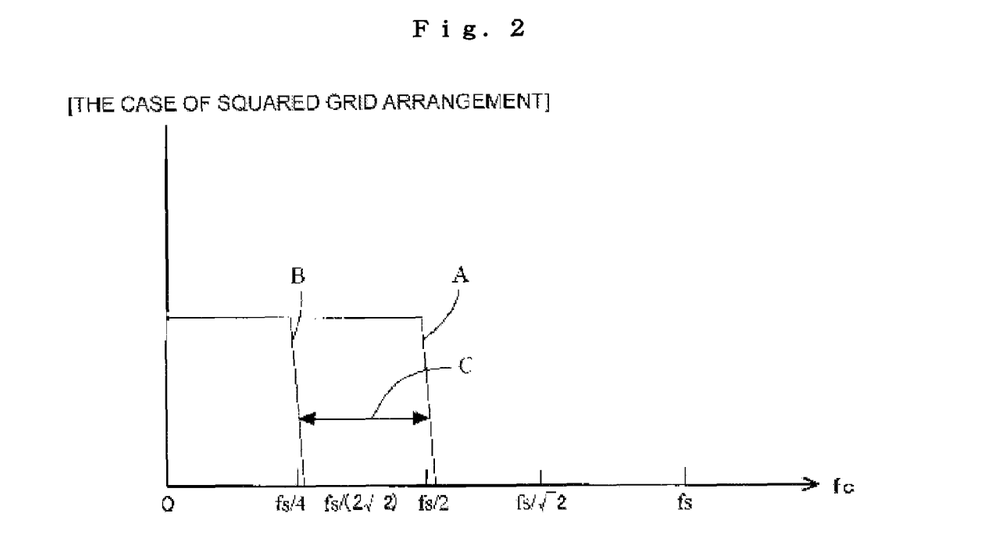
Figure 4:
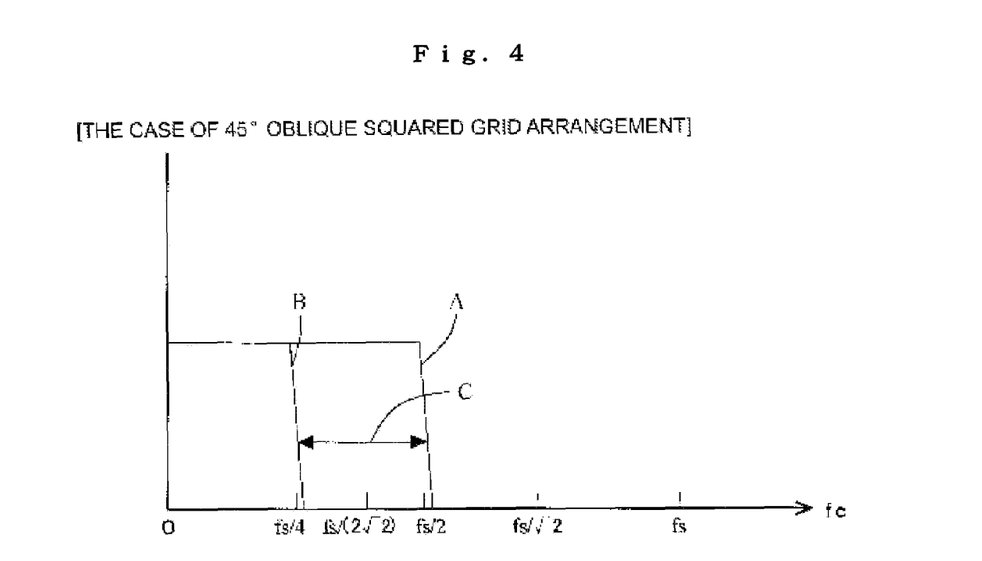

Further consideration of the mechanism causing the tendency of false colors poses a problem that, as shown in FIG. 2 or 4, the cutoff frequency fc of an optical low-pass filter has not been able to be set lower than half the sampling frequency (Nyquist frequency) of every color.

Figure 1:
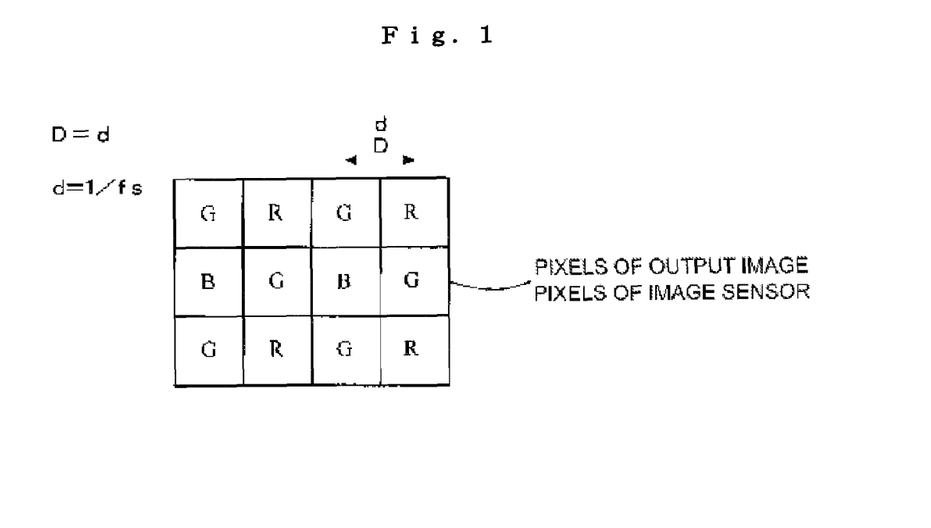
FIG. 1 is a schematic diagram showing a relationship between an image sensor and an output image in the case of a conventional squared grid arrangement.

For example, as shown in FIGS. 1 and 2, for an image sensor in which color filters are arranged in a Bayer pattern on imaging pixels arranged as a squared grid (pixel pitch: d), the cutoff frequency fc of the optical low-pass filter is preferably set lower than the Nyquist frequency for the sampling frequency of every color. In practice, to avoid sacrificing the resolution, the cutoff frequency fc is set to a value around fs/2 (fs: sampling frequency of the image sensor) with respect to the sampling frequency in the longitudinal and lateral directions for G, because G has a high effect on vision. While this cutoff frequency fc can filter out unnecessary high frequencies in the longitudinal and lateral directions for G, it passes frequencies higher than the Nyquist frequency in the longitudinal and lateral directions for R and B and the Nyquist frequencies in the oblique direction for R, G, and B. Therefore, there is a disadvantage that pixel signals for these colors are not properly estimated and false colors tend to occur.

The occurrence of false colors for each color may be prevented by setting the cutoff frequency fc of the optical low-pass filter to a value lower than the Nyquist frequency for the sampling frequency in the longitudinal and lateral directions for R and B, which is the lowest sampling frequency among those of R, G, and B. However, this has a disadvantage of the lack of signals for the G component, so that the resolution of the generated output image is reduced and the image is blurred.

Figure 3:
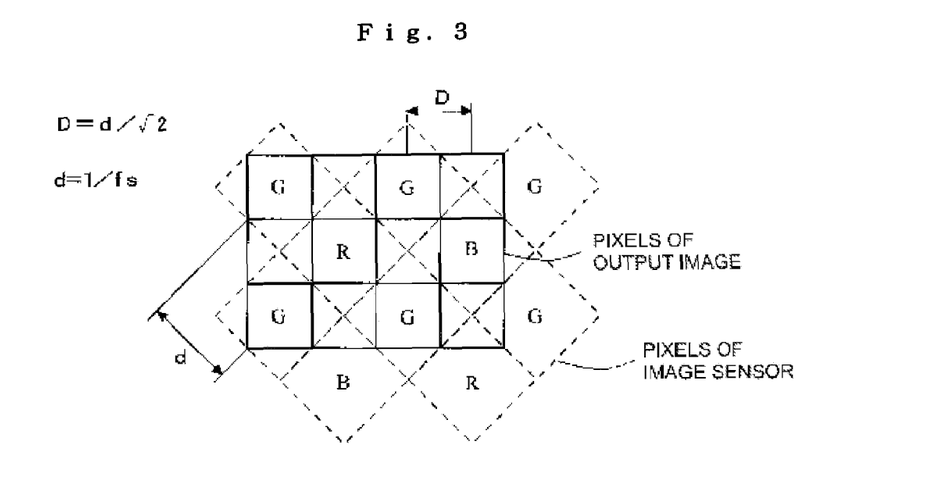
FIG. 3 is a schematic diagram showing a relationship between an image sensor and an output image in the case of a conventional 45° oblique squared grid arrangement.

As shown in FIGS. 3 and 4, for an image sensor in which color filters are arranged in the Bayer pattern on imaging pixels arranged as a 45° oblique squared grid (pixel pitch: d), the cutoff frequency fc of the optical low-pass filter is preferably set lower than the Nyquist frequency for the sampling frequency of every color. In practice, to avoid sacrificing the resolution, the cutoff frequency fc is set to a value around fs/2 (fs: sampling frequency of the image sensor) with respect to the sampling frequency in the oblique direction for G, because G has a high effect on vision. While this cutoff frequency fc can filter out unnecessary high frequencies in the oblique direction for G, it passes frequencies higher than the Nyquist frequencies in the other directions, i.e., the longitudinal and lateral directions, and in the longitudinal, lateral, and oblique directions for the other colors R and B. Therefore, as in the above-described squared grid arrangement, there is a disadvantage that pixel signals for these colors are not properly estimated and false colors tend to occur. Conversely, the occurrence of false colors may be prevented by setting the cutoff frequency fc with respect to the sampling frequency of the R and B components. However, this poses a problem that the resolution of the output image is reduced and the image is blurred.

The problem of false colors as seen in the single-chip type will not occur if the image sensor is configured to be of three-chip type. However, this will pose another significant problem that the complicated mechanism will lead to the increase in size and weight, which goes against the need for compact design. The three-chip type will also have a problem of requiring more strict positioning accuracy because misalignment in combining signals output from the imaging sensors for the respective three colors will likely to cause a disorder in the image.

The present invention has been made to solve these problems and aims to provide an imaging device capable of improving the color reproduction ability and the resolution ability to the level of a three-chip image sensor while using a simple single-chip image sensor.

An imaging device according to the present invention is including: an imaging optical system with an optical low-pass filter having predetermined frequency characteristics; color filters that separate an imaging light passed through the imaging optical system into predetermined color components; an image sensor that photoelectrically converts the imaging light passed through the color filters to generate pixel signals; and an output image signal generating unit that generates output image signals based on the pixel signals obtained from the image sensor, wherein the frequency characteristics of the optical low-pass filter are set in such a way that a first false color passing ratio is not higher than a specified value, the first false color passing ratio indicating the ratio of frequency components allowed to pass through in a frequency component region not lower than the Nyquist frequency for the lowest sampling frequency among sampling frequencies in the longitudinal, lateral, and oblique directions for each color component in the image sensor, and lower than the Nyquist frequency for the sampling frequency of the image sensor, and the output image signals are generated from the pixel signals generated by the image sensor so that N pixel signals (N is a real number of 2 or above) generated by the image sensor correspond to one output image signal.

In the present invention, the first false color passing ratio is preferably set to 0.4 or below.

An imaging device according to the present invention is including: an imaging optical system with an optical low-pass filter having predetermined frequency characteristics; color filters that separate an imaging light passed through the imaging optical system into predetermined color components; an image sensor that photoelectrically converts the imaging light passed through the color filters to generate pixel signals; and an output image signal generating unit that generates output image signals based on the pixel signals obtained from the image sensor, wherein the frequency characteristics of the optical low-pass filter are set in such a way that a second false color passing ratio is not higher than a specified value, the second false color passing ratio indicating the ratio of frequency components allowed to pass through in a frequency component region not lower than the intermediate frequency between the Nyquist frequency for the lowest sampling frequency among sampling frequencies in the longitudinal, lateral, and oblique directions for each color component in the image sensor and the Nyquist frequency for the sampling frequency of the image sensor, and lower than the Nyquist frequency for the sampling frequency of the image sensor, and the output image signals are generated from the pixel signals generated by the image sensor so that N pixel signals (N is a real number of 2 or above) generated by the image sensor correspond to one output image signal.

In the present invention, the second false color passing ratio is preferably set to 0.2 or below.

Furthermore, in the present invention, $$N=(fs/Fs)^2,$$

wherein fs is the sampling frequency of the image sensor and Fs is the sampling frequency of an output image formed by the output image signals.

According to the present invention, both the color reproduction ability and the resolution ability can be improved to the level of a three-chip image sensor while a simple single-chip image sensor is used.

BRIEF DESCRIPTION OF THE DRAWINGS

FIG. 2 is a schematic diagram showing a relationship between the cutoff frequency of an optical low-pass filter and the Nyquist frequency for each color in the case of the conventional squared grid arrangement, wherein fs/4 denotes the Nyquist frequency in the longitudinal and lateral directions for R and B, fs/(2√2) denotes the Nyquist frequency in the oblique direction for R, G, and B, fs/2 denotes the Nyquist frequency in the longitudinal and lateral directions for G and the sampling frequency in the longitudinal and lateral directions for R and B, fs/√2 denotes the sampling frequency in the oblique direction for R, G, and B, and fs denotes the sampling frequency in the longitudinal and lateral directions for G, and wherein reference symbol A denotes a passing characteristic of a conventional optical low-pass filter and reference symbol B denotes a passing characteristic that is optimal from the viewpoint of prevention of false colors but involves a reduction in the resolution, and wherein the use of the optical low-pass filter with A causes false colors due to frequencies passing through in the area C;

FIG. 4 is a schematic diagram showing a relationship between the cutoff frequency of an optical low-pass filter and the Nyquist frequency for each color in the case of the conventional 45° oblique squared grid arrangement, wherein fs/4 denotes the Nyquist frequency in the oblique direction for R and B, fs/(2√2) denotes the Nyquist frequency in the longitudinal and lateral directions for R, G, and B, fs/2 denotes the Nyquist frequency in the oblique direction for G and the sampling frequency in the oblique direction for R and B, fs/√2 denotes the sampling frequency in the longitudinal and lateral directions for R, G, and B, and fs denotes the sampling frequency in the oblique direction for G, and wherein reference symbol A denotes a passing characteristic of a conventional low-pass filter and reference symbol B denotes a passing characteristic that is optimal from the viewpoint of prevention of false colors but involves a reduction in the resolution, and wherein the use of the optical low-pass filter with A causes false colors due to frequencies passing through in the area C;

FIG. 8 is a diagram showing the relationship between false colors occurring in the image sensor and the spatial frequency, wherein reference symbol A denotes an area in which the false colors occur due to sampling in the image sensor, reference symbol B denotes an area in which the occurring false colors are easier to suppress by image processing, reference symbol C denotes an area in which conventional digital cameras have attempted to suppress the false colors with the optical low-pass filter, the reference symbol D denotes an area in which the occurring false colors are harder to suppress by image processing, and the reference symbol E denotes an area in which the false colors are likely to occur with conventional techniques, and wherein the false colors in the area E is eliminated by techniques of the present patent application;

BEST MODE FOR CARRYING OUT THE INVENTION

An embodiment of an imaging device 1 according to the present invention will be described below using the drawings.

Figure 5:
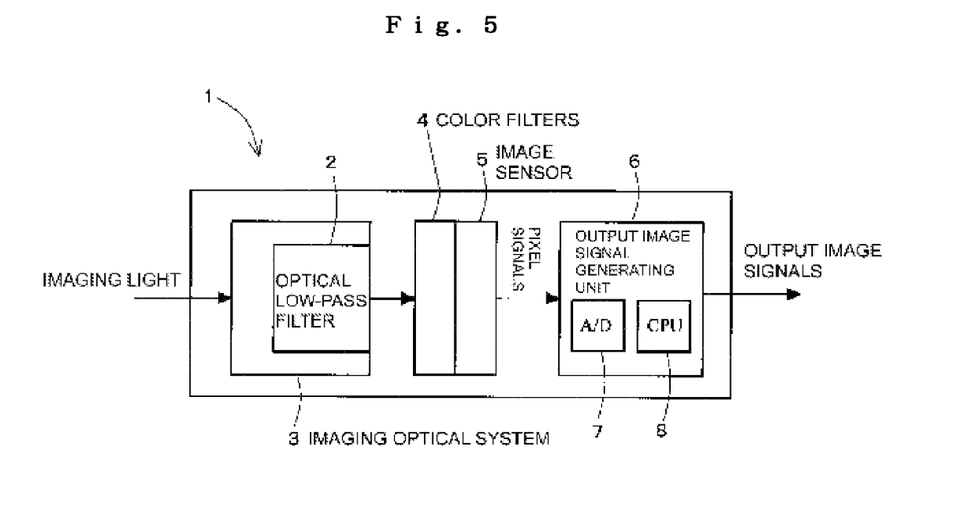
FIG. 5 is a schematic diagram showing an embodiment of an imaging device according to the present invention.

FIG. 5 is a diagram showing main components of the imaging device 1 according to the present invention. The imaging device 1 according to the present invention includes: an imaging optical system 3 with an optical low-pass filter 2; color filters 4 that separate an imaging light output from the imaging optical system 3 into predetermined color components; an image sensor 5 that photoelectrically converts the imaging light passed through the color filters 4 to generate pixel signals; and an output image signal generating unit 6 that generates output image signals based on the pixel signals obtained from the image sensor 5.

Each component in this embodiment will be described in more detail. The optical low-pass filter 2 is responsible for suppressing high spatial frequency components of the imaging light. The optical low-pass filter 2 has predetermined frequency characteristics and is placed ahead of the image sensor 5 on the optical path of the imaging light. Means with any structures capable of cutting off certain high frequencies of the imaging light, such as a crystal filter or a diffraction grating, may be used as the optical low-pass filter 2. Besides such structures capable of cutting off high frequencies of the imaging light, means capable of defocusing the imaging light directed to the image sensor 5 may be used.

In this embodiment, to reduce false colors produced by the sampling in the image sensor 5, a frequency characteristic of the optical low-pass filter 2 is set to a specified value as will be described later so that frequency components causing the false colors are suppressed.

The imaging optical system 3 is responsible for guiding the imaging light to the image sensor 5. In this embodiment, the imaging optical system 3 includes devices such as a shooting lens and an infrared cut-off filter, as well as the optical low-pass filter 2. The infrared cut-off filter is used for cutting off the infrared entering the photodiodes and is placed ahead of the optical low-pass filter 2 in the form of a glass block.

The color filters 4 are arranged regularly in a predetermined pattern on the photoreceptive surface of pixels constituting the image sensor 5 and are responsible for filtering the imaging light to make it into predetermined color components. As tricolor filters of a first, second, and third colors implementing the color filters 4, this embodiment uses primary-color filters of R, G, and B. However, the color filters are not limited to this but may be complementary-color filters including C (cyan), M (magenta), and Y (yellow), or of other combinations of colors. Further, emerald filters may be added to the tricolor filters.

Figure 6:
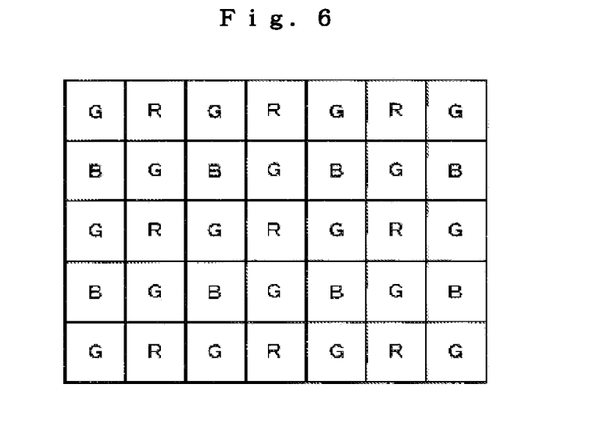
FIG. 6 is a schematic diagram showing color filters arranged in a Bayer pattern in an image sensor of the embodiment.

As an arrangement pattern of the color filters 4, this embodiment employs the Bayer arrangement as shown in FIG. 6, in which G filters are arranged checkerwise and R and B filters are arranged alternately on a row basis. However, this is not a limitation.

Figure 7:
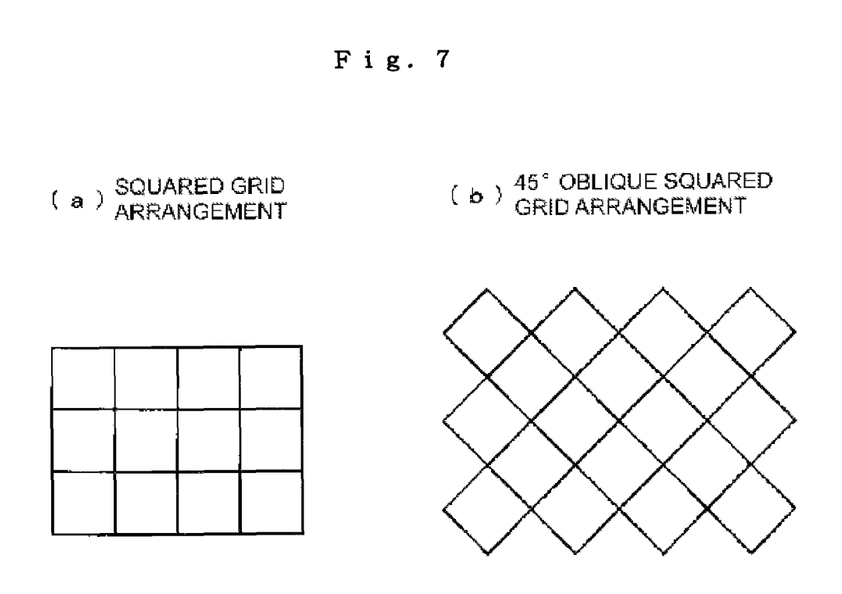
FIG. 7 is a schematic diagram showing pixels arranged as (a) a squared grid and (b) a 45° oblique squared grid in the image sensor of the embodiment.

The image sensor 5 is responsible for photoelectrically converting the received imaging light into electric image information and accumulating it as charge content, which is output to the output image signal generating unit 6 as electric signals. The image sensor 5 has pixels (photodiodes) arranged in a predetermined pattern, and the color filters 4 are arranged regularly in a predetermined pattern on the photoreceptive surface of the respective pixels. Generally known pixel arrangement patterns include a squared grid arrangement as shown in FIG. 7(*a*), and a 45° oblique squared grid arrangement as shown in FIG. 7(*b*) obtained by rotating the squared grid arrangement by 45°.

The output image signal generating unit 6 is responsible for generating output image signals by subjecting the pixel signals obtained from the pixels of the image sensor 5 to A/D conversion and various kinds of image processing. The output image signal generating unit 6 is configured with an A/D converter 7 and a CPU 8 (Central Processing Unit) and electrically connected with the image sensor 5. The A/D converter 7 converts the pixel signals, which are analog electric signals, into digital data. The CPU 8 generates the output image signals by subjecting the A/D converted pixel signals to various kinds of image processing, such as optical black processing, white balance processing, color correction processing, color interpolation processing, noise reduction processing, edge enhancement processing, gamma correction processing, and resolution conversion processing. Here, the conversion ratio in the resolution conversion processing is set in such a way that N pixel signals (N is a real number of 2 or above) subjected to the A/D conversion correspond to one output image signal.

Although the output image signal generating unit 6 is configured with the CPU 8 in this embodiment, this is not a limitation. For example, the output image signal generating unit 6 may be configured with a DSP (Digital Signal Processor) or a hardwired logic, or the A/D converted pixel signals may be taken into a PC (Personal Computer) to cause various programs to perform the above-mentioned image processing.

Now, description will be given of the relationship between the frequency characteristics of the optical low-pass filter 2 and the conversion ratio in the resolution conversion processing of the CPU 8. As described above, to reduce as much false colors produced by the sampling in the image sensor 5 as possible, this embodiment cuts off frequency components lower than the Nyquist frequency for the sampling frequency fs of the image sensor 5 (hereafter referred to as the image sensor Nyquist frequency fs/2), which have been allowed to pass through in conventional imaging devices.

Figure 8:
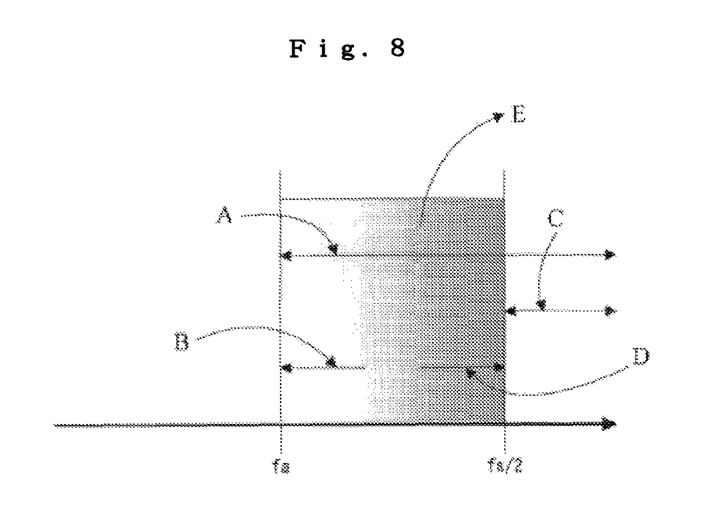

Specifically, as shown in FIG. 8, frequency components not lower than the Nyquist frequency for the lowest sampling frequency among the sampling frequencies in the longitudinal, lateral, and oblique directions for each color component in the image sensor 5 (hereafter referred to as the lowest Nyquist frequency fa) can cause false colors. Therefore, the frequency components not lower than the lowest Nyquist frequency fa are suppressed by the frequency characteristics of the optical low-pass filter 2 and the image processing of the CPU 8.

However, suppressing frequency components lower than the Nyquist frequency for the sampling frequency fs of the image sensor 5 reduces the resolution of the pixel signals generated by the image sensor 5. To prevent this reduction in the resolution, this embodiment sets the conversion ratio in the resolution conversion processing of the CPU 8 in such a way that N pixel signals (N is a real number of 2 or above) generated by the image sensor 5 correspond to one output image signal. Thus, the number of samplings in the image sensor 5 correspond to one pixel of the output image becomes two or above, and the resolution of the output image is increased up to the maximum frequency that can be represented by the output image signals (the Nyquist frequency Fs/2 for the sampling frequency Fs of the output image).

Now, the frequency characteristics of the optical low-pass filter 2 will be described. As described above, the imaging device 1 in this embodiment is characterized by cutting off frequency components not lower than the lowest Nyquist frequency fa that cause false colors. It is therefore ideal to entirely cut off the frequency components not lower than the lowest Nyquist frequency fa. However, this is difficult with the actual optical low-pass filter 2. In this embodiment, the frequency characteristics of the optical low-pass filter 2 are set from the viewpoint of the ratio at which the frequency components lower than the image sensor Nyquist frequency fs/2, which have been allowed to pass through in conventional imaging devices, are cut off. Two cases are assumed here: the case where the frequency components not lower than the lowest Nyquist frequency fa is suppressed mainly by the optical low-pass filter 2; and the case where suppression by the image processing of the CPU 8 is utilized as much as possible and frequency components that cannot be suppressed by the image processing are suppressed by the optical low-pass filter 2. An appropriate value for the frequency characteristics is set for each case.

Figure 9:
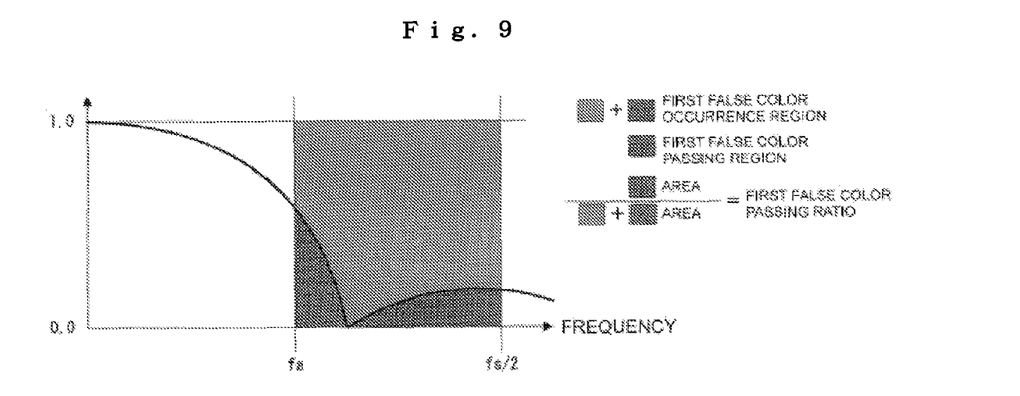
FIG. 9 is a diagram showing frequency characteristics of the optical low-pass filter in the case where false colors are reduced mainly by the optical low-pass filter.

First, in the case where false colors are reduced mainly by the optical low-pass filter 2, the optical low-pass filter 2 has the frequency characteristics as shown in FIG. 9. Specifically, frequency components not lower than the lowest Nyquist frequency fa and lower than the image sensor Nyquist frequency fs/2 correspond to a first false color occurrence region. Then, a first false color passing ratio is defined as the ratio of frequency components allowed to pass through in the first false color occurrence region. The frequency components allowed to pass through in the first false color occurrence region shown in FIG. 9 correspond to a first false color passing region. The first false color passing ratio is calculated by the ratio of the area of the first false color passing region to the area of the first false color occurrence region.

Figure 10:
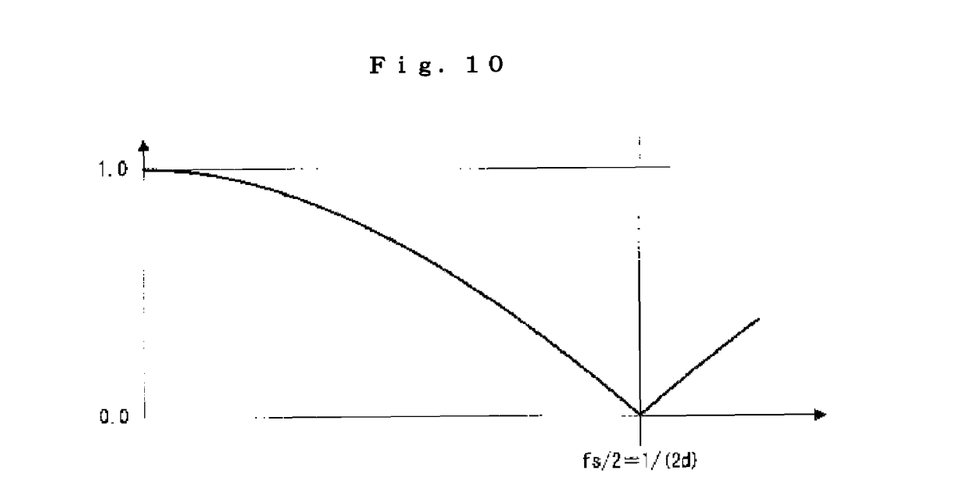
FIG. 10 is a diagram showing frequency characteristics of the optical low-pass filter implemented with crystal for describing a first false color passing ratio and a second false color passing ratio.

This embodiment sets the first false color passing ratio to 0.4 or below. This first false color passing ratio was calculated by assuming the crystal birefringence, which is generally utilized to implement the optical low-pass filter 2. That is, if a low-pass filter in which a light is passed through the crystal and separated into two lights is provided, where the distance between the two imaging lights obtained by the separation is the pixel pitch d of the image sensor, then the optical low-pass filter 2 has a frequency characteristic that the null point frequency is $1/(2d)$ as shown in FIG. 10.

However, in conventional single-chip digital cameras, since setting the null point frequency to $1/(2d)$ makes the resolution too low, the value of the null point frequency is set higher for reducing the effect of the low-pass filter. On the other hand, in this embodiment according to the present invention, the resolution of the output image signals can be relatively increased by the output image signal generating unit 6 even if the resolution is low at the sampling stage in the image sensor 5. Therefore, contrary to the conventional single-chip digital cameras, false colors can be suppressed without reducing the resolution although the effect of the low-pass filter is increased.

Thus, the position causing the optical low-pass filter 2 to separate the light by the pixel pitch d is the border between the conventional imaging devices and the imaging device of this embodiment. In both cases where the image sensor has the color filters arranged in the Bayer pattern on the imaging pixels arranged as a squared grid and where the image sensor has the color filters arranged in the Bayer pattern on the imaging pixels arranged as a 45° oblique squared grid, $fs/2=1/(2d)$, and $fa=1/(4d)$. Therefore, calculating the first false color passing ratio results in: the first false color passing ratio=$0.372892484 \approx 0.4$.

Thus, the first false color passing ratio in this embodiment is set to a value of 0.4 or below. In this case, while the optical low-pass filter 2 is set more intensively, the burden on the CPU 8 performing the image processing is advantageously reduced. Since false colors are caused not only by the aliasing of high frequency components due to the sampling in the image sensor 5, a certain degree of image processing is necessary in any situations.

Figure 11:
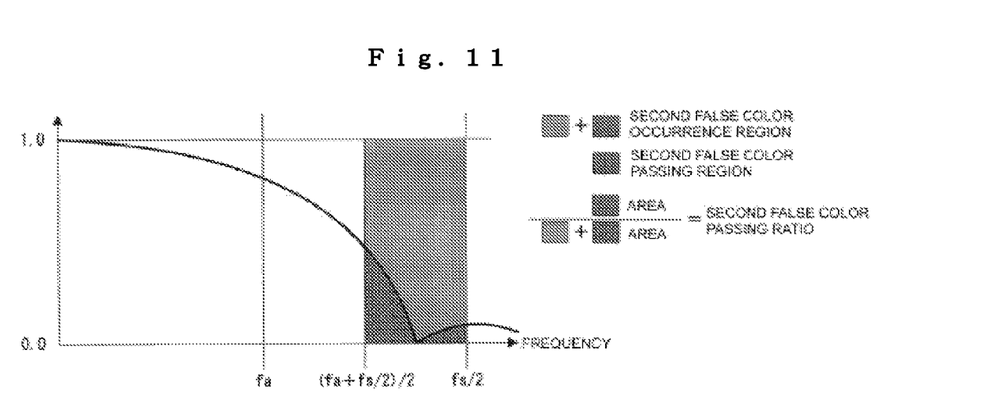
FIG. 11 is a diagram showing frequency characteristics of the optical low-pass filter in the case where false colors are reduced primarily with image processing by a CPU and with less intensive filtering by the optical low-pass filter.

In the case where false colors are reduced by making active use of the image processing of the CPU 8 with less intensive filtering by the optical low-pass filter 2, the optical low-pass filter 2 has the frequency characteristics as shown in FIG. 11. Specifically, frequency components not lower than the intermediate frequency $(fa+fs/2)/2$ between the lowest Nyquist frequency fa and the image sensor Nyquist frequency fs/2, and lower than the image sensor Nyquist frequency fs/2, correspond to a second false color occurrence region. Then, a second false color passing ratio is defined as the ratio of frequency components allowed to pass through in the second frequency component occurrence region. This is based on the fact that frequency components closer to the lowest Nyquist frequency fa are easier to suppress by the image processing while frequency components closer to the image sensor Nyquist frequency fs/2 are harder to suppress by the image processing. The frequency components allowed to pass through in the second false color occurrence region shown in FIG. 11 correspond to a second false color passing region. The second false color passing ratio is calculated by the ratio of the area of the second false color passing region to the area of the second false color occurrence region.

This embodiment sets the second false color passing ratio to 0.2 or below. This value was determined for the reason similar to the above-described first false color passing ratio, and calculated as: the second false color passing ratio=0.194113388≈0.2. Therefore, while the image processing of the CPU 8 should be strictly performed, the optical low-pass filter 2 can advantageously be set less intensively.

Figure 12:
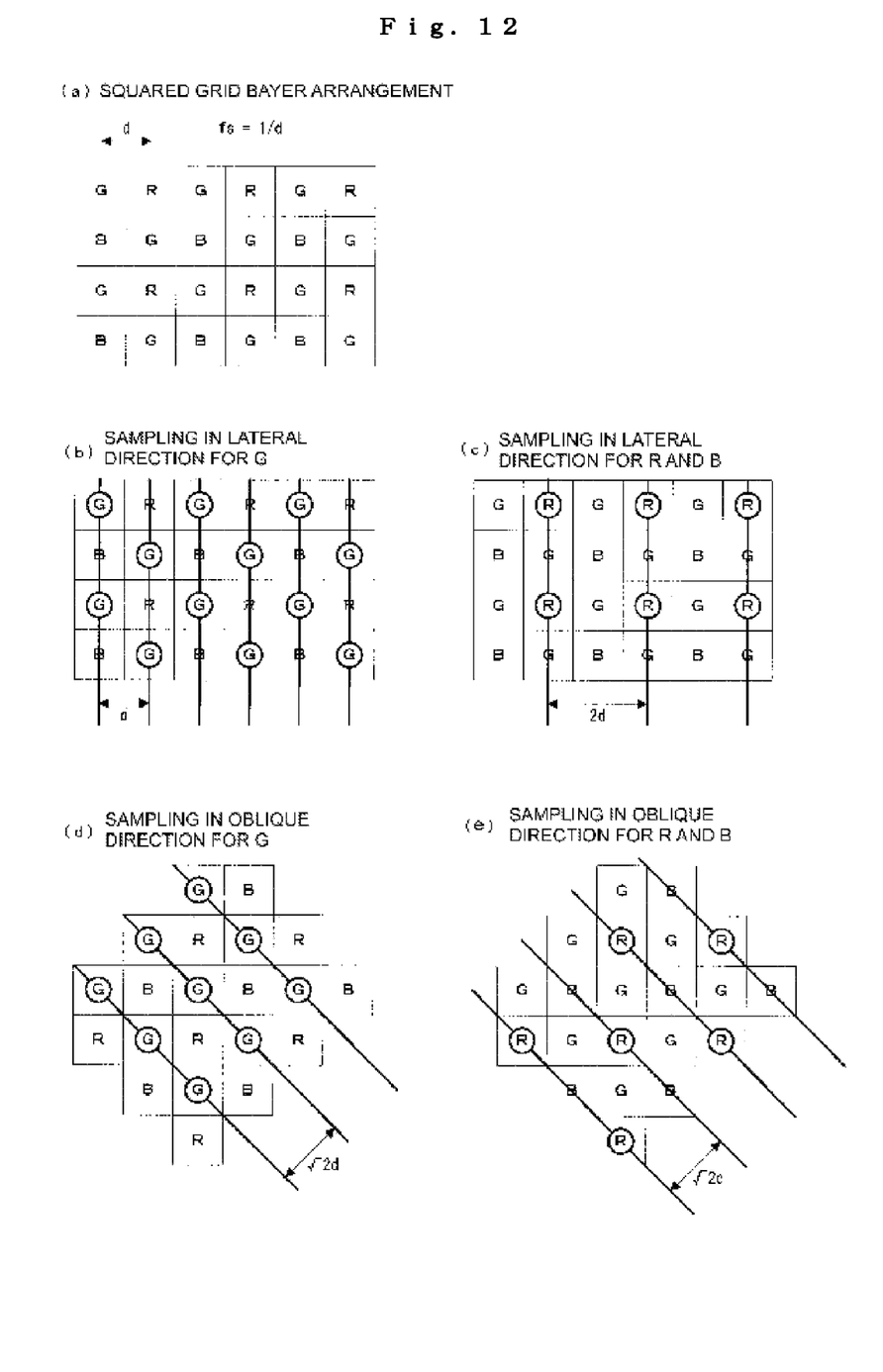
FIG. 12 is a schematic diagram showing (a) an imaging pixel pitch, (b) a sampling interval in the longitudinal and lateral directions for G, (c) a sampling interval in the longitudinal and lateral directions for R and B, (d) a sampling interval in the oblique direction for G, and (e) a sampling interval in the oblique direction for R and B in the image sensor in which the color filters are arranged in the Bayer pattern on the imaging pixels arranged as a squared grid.

Now, the lowest Nyquist frequency fa will be described. FIG. 12 shows the image sensor 5 arranged as a squared grid. In this case, if the pixel pitch d of the image sensor 5 is used as shown in FIG. 12($a$), the sampling interval in the lateral direction for G is d (FIG. 12($b$)), the sampling interval in the lateral direction for R (and B) is 2d (FIG. 12($c$)), the sampling interval in the oblique direction for G is $\sqrt{2}$d (FIG. 12($d$)), and the sampling interval in the oblique direction for R (and B) is $\sqrt{2}$d (FIG. 12($e$)). Among these sampling intervals, the longest sampling interval is the sampling interval 2d in the longitudinal and lateral directions for R and B. Therefore, the lowest Nyquist frequency fa is 1/(4d), i.e., the Nyquist frequency in the longitudinal and lateral directions for R and B.

Figure 13:
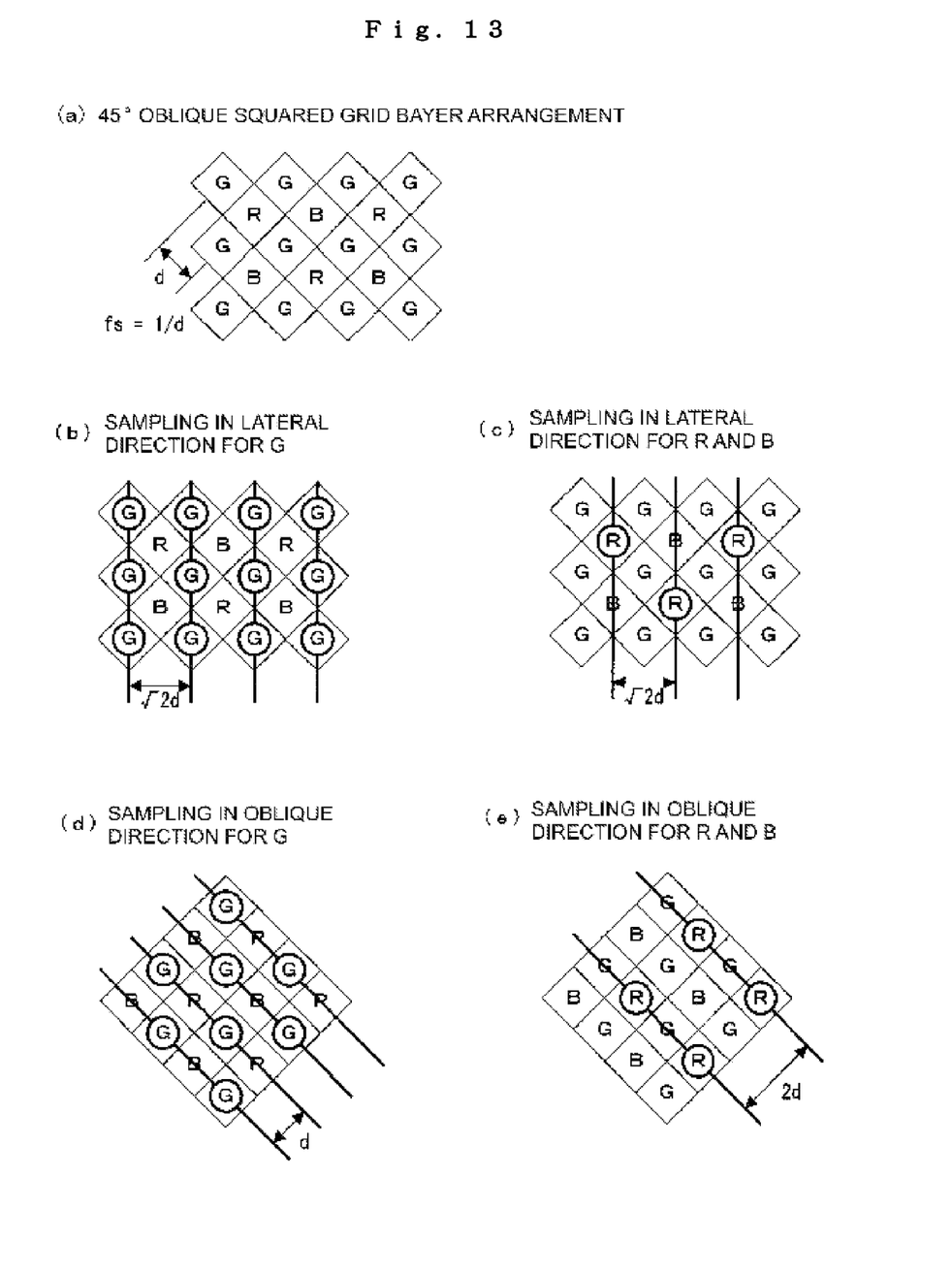
FIG. 13 is a schematic diagram showing (a) an imaging pixel pitch, (b) a sampling interval in the longitudinal and lateral directions for G, (c) a sampling interval in the longitudinal and lateral directions for R and B, (d) a sampling interval in the oblique direction for G, and (e) a sampling interval in the oblique direction for R and B in the image sensor in which the color filters are arranged in the Bayer pattern on the imaging pixels arranged as a 45° oblique squared grid.

FIG. 13 shows the image sensor 5 arranged as a 45° oblique squared grid. In this case, if the pixel pitch in the 45° oblique direction of the image sensor 5 is used as the pixel pitch d as shown in FIG. 13($a$), the sampling interval in the lateral direction for G is $\sqrt{2}$d (FIG. 13($b$)), the sampling interval in the lateral direction for R (and B) is $\sqrt{2}$d (FIG. 13($c$)), the sampling interval in the oblique direction for G is d (FIG. 13($d$)), and the sampling interval in the oblique direction for R (and B) is 2d (FIG. 13($e$)). Among these sampling intervals, the longest sampling interval is the sampling interval 2d in the oblique direction for R and B. Therefore, the lowest Nyquist frequency fa is 1/(4d), i.e., the Nyquist frequency in the oblique direction for R and B. This is the same as in the image sensor 5 arranged as a squared grid.

Thus, in this embodiment, when the image sensor 5 arranged as a squared grid or a 45° oblique squared grid (pixel pitch: d) is used to generate the output image, the optical filter 2 is selected such that the first false color occurrence region corresponds to values equal to or above 1/(4d) and below 1/(2d) and the condition of the above-described first or second color passing ratio is satisfied.

Now, an imaging method with the imaging device 1 in this embodiment will be described.

When an object is taken with the imaging device 1 in this embodiment, the imaging light from the object is first allowed to enter the optical low-pass filter 2 through the imaging optical system 3. For the imaging light that has entered the optical low-pass filter 2, spatial frequencies in a frequency region above the lowest Nyquist frequency fa of the image sensor 5 are mainly cut off according to the predetermined frequency characteristics. The imaging light passed thorough the optical low-pass filter 2 is separated into R, G, and B color components by the color filters 4 and imaged on the photo-receptive surface of the image sensor 5. Here, since false colors are considerably removed by the optical low-pass filter 2 compared to conventional single-chip imaging devices, the color reproduction ability for the output image is significantly improved.

The image sensor 5 accumulates, as electric charges, the imaging light that has entered the photodiodes constituting the pixels, and supplies the electric charges as pixel signals to the output image signal generating unit 6. Since the imaging light has been separated into three primary colors of R, G, and B by the color filters 4, the pixel signal for each pixel is read out as luminance information on one of the colors. The read-out pixel signals are converted into digital data by the A/D converter 7 and passed to the CPU 8. Based on the received pixel signals, the CPU 8 generates output image signals constituting the pixels of the output image. Here, since the number of pixels in the image sensor 5 used for generating each pixel of the output image is set larger compared to the conventional single-chip imaging devices, the resolution of the output image is significantly improved.

The output image signals obtained in the above manner are supplied as output signals of a digital camera or digital video camera provided with the imaging device 1 in this embodiment.

Now, specific examples of this embodiment will be described. In the following examples 1 to 5, the conversion ratio in the resolution conversion processing of the CPU 8, i.e., the number N of pixel signals used for generating an output image signal for one pixel, was determined for different pixel arrangements of the image sensor 5 and different ratios k (D=kd) of the pixel pitch D (=1/Fs) of the output image to the pixel pitch d (=1/fs) of the image sensor 5. In the following examples 1 to 5, as described above, the optical low-pass filter 2 with the frequency characteristics satisfying the condition of the first or second false color passing ratio was used. The color filters 4 used were arranged in the Bayer pattern.

EXAMPLE 1

Figure 14:
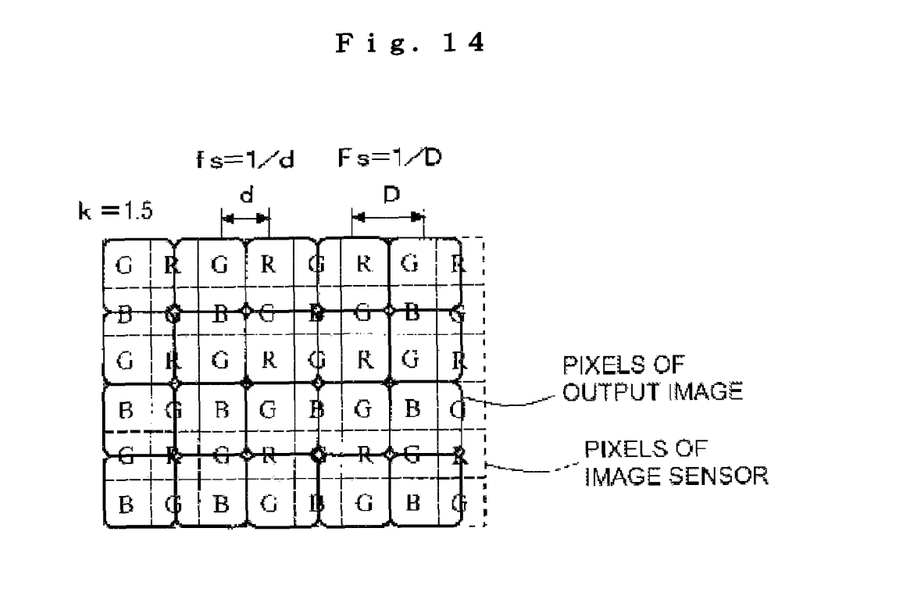
FIG. 14 is a schematic diagram showing the relationship between the image sensor and an output image in example 1.

In the example 1, as shown in FIG. 14, the image sensor 5 was used in which pixels were arranged as a squared grid and the ratio k of the pixel pitch D of the output image to the pixel pitch d of the image sensor 5 was 1.5 (D=1.5d). As can be seen from FIG. 14, since 2.25 pixel signals were sampled for an output image signal for one pixel, N is 2.25.

EXAMPLE 2

Figure 15:
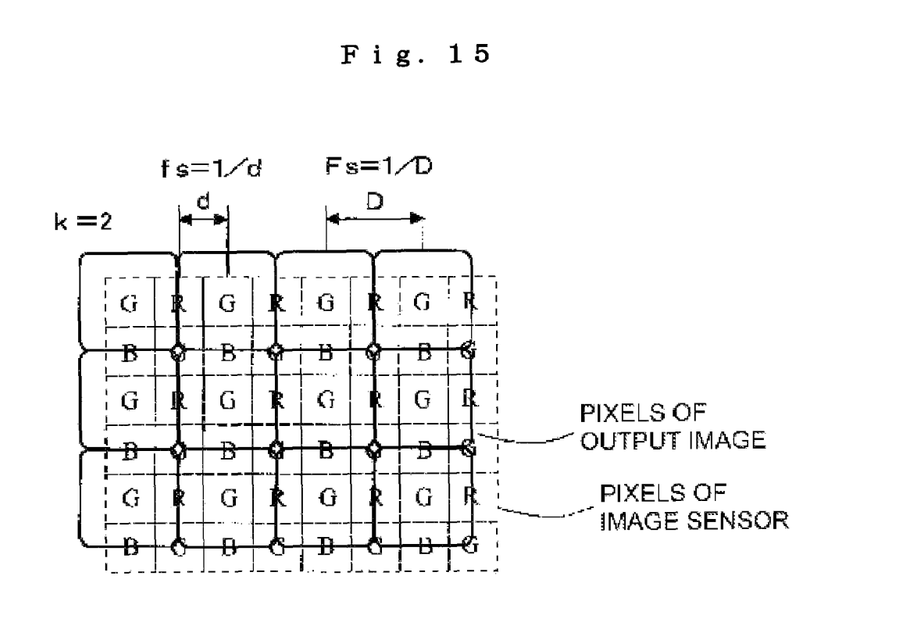
FIG. 15 is a schematic diagram showing the relationship between the image sensor and the output image in example 2.

In the example 2, as shown in FIG. 15, the image sensor 5 was used in which pixels were arranged as a squared grid and the ratio k of the pixel pitch D of the output image to the pixel pitch d of the image sensor 5 was 2 (D=2d). As can be seen from FIG. 15, since 4 pixel signals were sampled for an output image signal for one pixel, N is 4.

EXAMPLE 3

Figure 16:
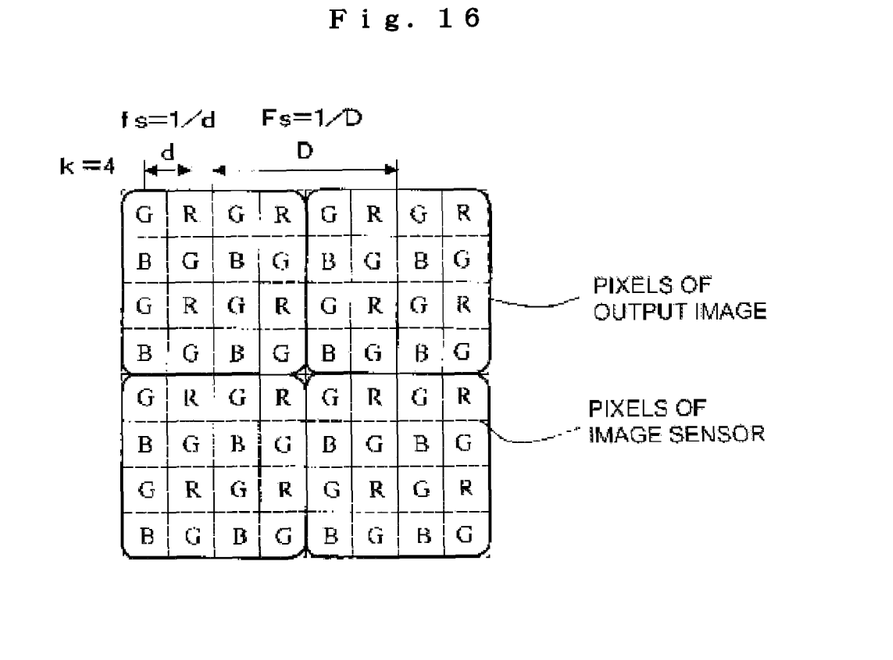
FIG. 16 is a schematic diagram showing the relationship between the image sensor and the output image in example 3.

In the example 3, as shown in FIG. 16, the image sensor 5 was used in which pixels were arranged as a squared grid and the ratio k of the pixel pitch D of the output image to the pixel pitch d of the image sensor 5 was 4 (D=4d). As can be seen from FIG. 16, since 16 pixel signals were sampled for an output image signal for one pixel, N is 16.

EXAMPLE 4

Figure 17:
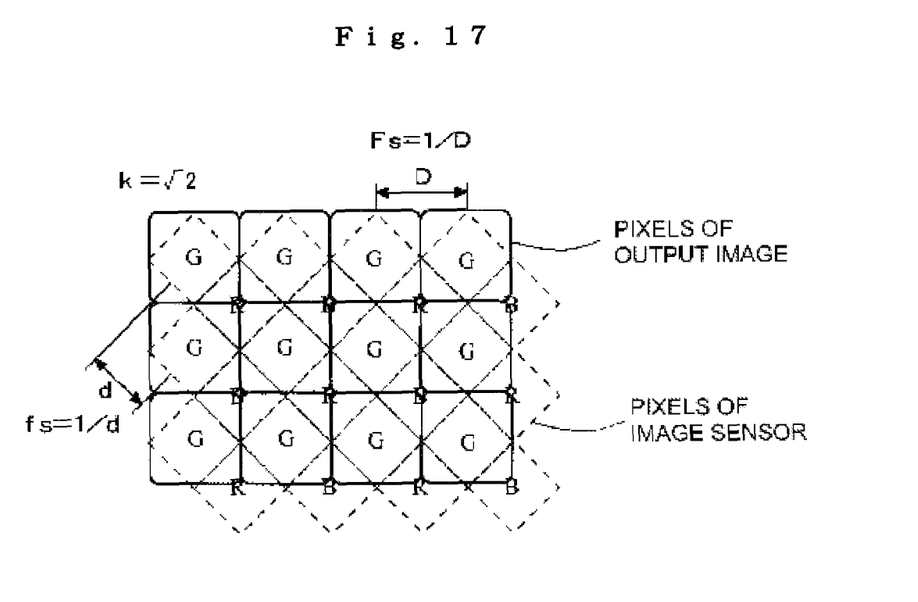
FIG. 17 is a schematic diagram showing the relationship between the image sensor and the output image in example 4.

In the example 4, as shown in FIG. 17, the image sensor 5 was used in which pixels were arranged as a 45° oblique squared grid and the ratio k of the pixel pitch D of the output image to the pixel pitch d of the image sensor 5 was $\sqrt{2}$ ($D=\sqrt{2}d$). As can be seen from FIG. 17, since 2 pixel signals were sampled for an output image signal for one pixel, N is 2.

EXAMPLE 5

Figure 18:
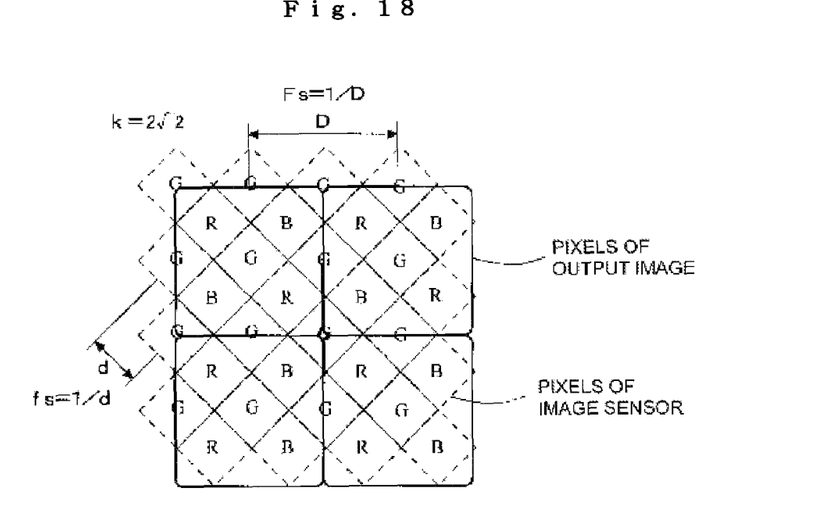
FIG. 18 is a schematic diagram showing the relationship between the image sensor and the output image in example 5.

In the example 5, as shown in FIG. 18, the image sensor 5 was used in which pixels were arranged as a 45° oblique squared grid and the ratio k of the pixel pitch D of the output image to the pixel pitch d of the image sensor 5 was $2\sqrt{2}$ ($D=2\sqrt{2}d$). As can be seen from FIG. 18, since 8 pixel signals were sampled for an output image signal for one pixel, N is 8.

It can be seen from the above examples 1 to 5 that, irrespective of the manner of arrangement of the image sensor 5, the number N of pixel signals generated by the image sensor 5 correspond to one output image signal is expressed as:

$$N=k^2=(D/d)^2=(fs/Fs)^2 \qquad \text{Formula (1).}$$

The sampling frequency Fs of the output image is expressed as:

$$Fs=1/D=1/(kd)=fs/k \qquad \text{Formula (2).}$$

Figure 19:
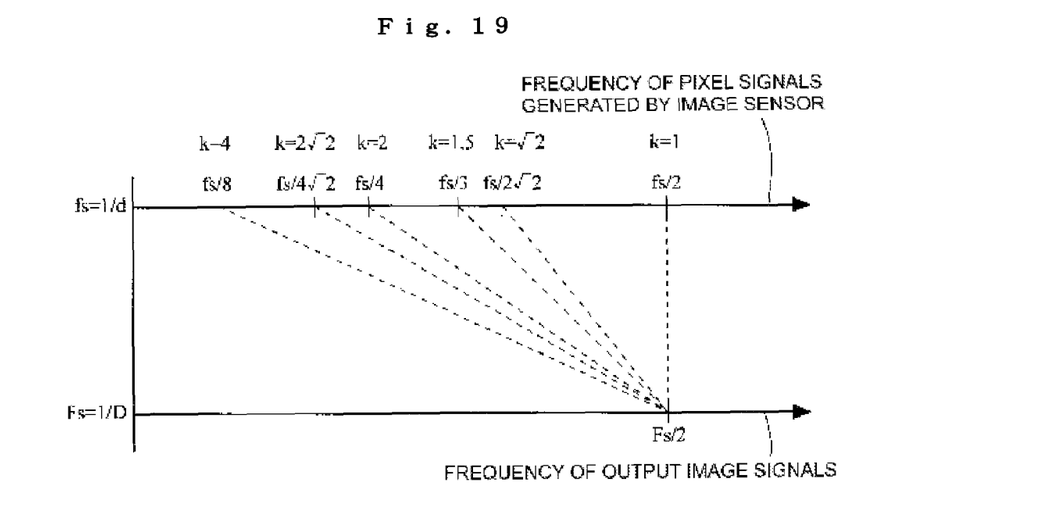
FIG. 19 is a diagram showing the relationship between the frequency of the pixel signals generated by the image sensor and the maximum frequency Fs/2 that can be represented in the output image in the examples 1 to 5 of the embodiment.

Therefore, in the examples 1 to 5, the relationship between the frequency of the pixel signals generated by the image sensor 5 and the maximum frequency Fs/2 that can be represented in the output image is as shown in FIG. 19. Further, since the frequency F of the output image is proportional to the frequency f of the pixel signals generated by the image sensor 5, F=f/k. Thus, if k is set to a value above 1.0, the frequency f of the image sensor 5 required to represent the frequency F of the output image can be low. This allows the resolution of the output image to be relatively improved.

According to the above embodiment, compared to conventional products, a larger number of pixels of the image sensor 5 are set per pixel of the output image, and also the optical low-pass filter 2 significantly removes false color components. This provides a conventionally unachieved superior effect that the color reproduction ability and the resolution ability can be improved to the level of a three-chip image sensor while the simple single-chip image sensor 5 is used.

The imaging device 1 according to the present invention is not limited to the above-described embodiment but may be modified as appropriate.

For example, although the embodiment has been described for the output image based on square pixels, this is not a limitation but an output image based on rectangular pixels may be configured and output. In that case, the sampling frequency will be different in the longitudinal direction and the lateral direction. The illustrated image sensor 5 has the imaging pixels arranged as a squared grid or a 45° oblique squared grid, and the illustrated color filters 4 are arranged in the Bayer pattern. However, this is not a limitation but the present invention is also applicable when other arrangements are selected.

INDUSTRIAL APPLICABILITY

The present invention is useful for an imaging device that takes an image of an object with a single-chip image sensor.

The invention claimed is:

1. An imaging device, comprising:
   an imaging optical system with an optical low-pass filter having predetermined frequency characteristics;
   color filters that separate an imaging light passed through the imaging optical system into predetermined color components;
   an image sensor that photoelectrically converts the imaging light passed through the color filters to generate pixel signals; and
   an output image signal generating unit that generates output image signals based on the pixel signals obtained from the image sensor, wherein
   the frequency characteristics of the optical low-pass filter are set in such a way that a first false color passing ratio is not higher than a specified value, the first false color passing ratio indicating the ratio of frequency components allowed to pass through in a frequency component region not lower than the Nyquist frequency for the lowest sampling frequency among sampling frequencies in the longitudinal, lateral, and oblique directions for each color component in the image sensor, and lower than the Nyquist frequency for the sampling frequency of the image sensor, and
   the output image signals are generated from the pixel signals generated by the image sensor so that N pixel signals (N is a real number of 2 or above) generated by the image sensor correspond to one output image signal.

2. The imaging device according to claim 1,
   the first false color passing ratio is set to 0.4 or below.

3. An imaging device, comprising:
   an imaging optical system with an optical low-pass filter having predetermined frequency characteristics;
   color filters that separate an imaging light passed through the imaging optical system into predetermined color components;
   an image sensor that photoelectrically converts the imaging light passed through the color filters to generate pixel signals; and
   an output image signal generating unit that generates output image signals based on the pixel signals obtained from the image sensor, wherein
   the frequency characteristics of the optical low-pass filter are set in such a way that a second false color passing ratio is not higher than a specified value, the second false color passing ratio indicating the ratio of frequency components allowed to pass through in a frequency component region not lower than the intermediate frequency between the Nyquist frequency for the lowest sampling frequency among sampling frequencies in the longitudinal, lateral, and oblique directions for each color component in the image sensor and the Nyquist frequency for the sampling frequency of the image sensor, and lower than the Nyquist frequency for the sampling frequency of the image sensor, and
   the output image signals are generated from the pixel signals generated by the image sensor so that N pixel signals (N is a real number of 2 or above) generated by the image sensor correspond to one output image signal.

4. The imaging device according to claim 3,
   the second false color passing ratio is set to 0.2 or below.

5. The imaging device according to claim 1, $$N=(fs/Fs)^2,$$

wherein fs is the sampling frequency of the image sensor and Fs is the sampling frequency of an output image formed by the output image signals.

6. The imaging device according to claim 3, $$N=(fs/Fs)^2,$$

wherein fs is the sampling frequency of the image sensor and Fs is the sampling frequency of an output image formed by the output image signals.

\* \* \* \* \*